(12) United States Patent
Fildebrandt et al.

(10) Patent No.: US 10,715,388 B2
(45) Date of Patent: Jul. 14, 2020

(54) USING A CONTAINER ORCHESTRATION SERVICE FOR DYNAMIC ROUTING

(71) Applicant: SAP SE, Walldorf (DE)

(72) Inventors: Ulf Fildebrandt, Oftersheim (DE); Sapreen Ahuja, Bangalore (IN)

(73) Assignee: SAP SE, Walldorf (DE)

( * ) Notice: Subject to any disclaimer, the term of this patent is extended or adjusted under 35 U.S.C. 154(b) by 26 days.

(21) Appl. No.: 16/214,356

(22) Filed: Dec. 10, 2018

(65) Prior Publication Data

US 2020/0186422 A1     Jun. 11, 2020

(51) Int. Cl.
G06F 15/173     (2006.01)
H04L 12/24      (2006.01)
H04L 29/08      (2006.01)

(52) U.S. Cl.
CPC .......... H04L 41/0846 (2013.01); H04L 67/10 (2013.01)

(58) Field of Classification Search
CPC ............................ H04L 41/0846; H04L 67/10
USPC ................................................. 709/223–225
See application file for complete search history.

(56) References Cited

U.S. PATENT DOCUMENTS

| 7,461,346 B2 | 12/2008 | Fildebrandt et al. |
| 7,584,457 B2 | 9/2009 | Hammerich et al. |
| 7,590,614 B2 | 9/2009 | Fildebrandt et al. |
| 7,734,560 B2 | 6/2010 | Seeger et al. |
| 7,757,204 B2 | 7/2010 | Fildebrandt et al. |
| 7,770,103 B2 | 8/2010 | Hammerich et al. |
| 7,774,745 B2 | 8/2010 | Fildebrandt et al. |
| 7,814,491 B1 * | 10/2010 | Chen ..................... G06F 9/5016 709/226 |
| 7,840,935 B2 | 11/2010 | Fildebrandt et al. |
| 7,840,936 B2 | 11/2010 | Seeger et al. |
| 7,853,923 B2 | 12/2010 | Muenkel et al. |
| 7,873,942 B2 | 1/2011 | Shaburov et al. |
| 7,962,892 B2 | 6/2011 | Shaburov et al. |
| 8,126,961 B2 | 2/2012 | Fildebrandt |
| 8,341,593 B2 | 12/2012 | Fildebrandt et al. |
| 8,689,174 B2 | 4/2014 | Shaburov et al. |
| 8,978,035 B2 | 3/2015 | McGrath et al. |
| 9,411,665 B2 | 8/2016 | Fildebrandt |
| 9,996,344 B2 | 6/2018 | Fildebrandt et al. |
| 2012/0209947 A1 * | 8/2012 | Glaser ................... G06F 9/5027 709/217 |

(Continued)

OTHER PUBLICATIONS

U.S. Appl. No. 16/148,008, filed Oct. 1, 2018, Fildebrandt, et al.

(Continued)

*Primary Examiner* — Duyen M Doan
(74) *Attorney, Agent, or Firm* — Fish & Richardson P.C.

(57) ABSTRACT

The disclosure generally describes methods, software, and systems for using resources in the cloud. An integration flow (iFlow) is deployed as a resource by a cloud integration system. The resource is assigned by a container orchestration service to one or more pods. An iFlow definition that is mapped to the resource is copied into a corresponding pod by a pod sync agent. A unique label is assigned by the pod sync agent to each resource based on iFlows deployed into the pod. A service is created as an endpoint to the resource by the cloud integration system with a rule redirecting calls to the one or more pods containing the resource.

20 Claims, 7 Drawing Sheets

(56) References Cited

U.S. PATENT DOCUMENTS

| | | | |
|---|---|---|---|
| 2014/0068075 A1* | 3/2014 | Bonilla | H04L 41/0823 |
| | | | 709/226 |
| 2014/0351443 A1* | 11/2014 | Tang | G06F 9/45533 |
| | | | 709/226 |
| 2016/0034318 A1 | 2/2016 | Byreddy et al. | |
| 2016/0357535 A1* | 12/2016 | Gravenites | G06F 8/60 |
| 2019/0102226 A1* | 4/2019 | Caldato | H04L 67/10 |
| 2019/0163536 A1* | 5/2019 | Parees | G06F 9/5055 |
| 2019/0243687 A1* | 8/2019 | Chen | G06F 11/3414 |

OTHER PUBLICATIONS

Extended European Search Report issued in European Application No. 19209365.6 dated May 6, 2020, 8 pages.

\* cited by examiner

USING A CONTAINER ORCHESTRATION SERVICE FOR DYNAMIC ROUTING

BACKGROUND

The present disclosure relates to handling load distributions of applications running in the cloud. Some cloud integration systems can struggle with load distributions of message exchange, for example, when too many integration scenarios run on one runtime node. Existing techniques for distributing integration scenarios to multiple nodes encounter limitations in defining routing information in a dynamic way. The distribution of integration scenarios can be done in many ways. For example, some conventional systems use a separate runtime such as NGINX or another load balancer to do routing for web applications. Separate instances can be installed in a distributed system, and the configuration can be run in a separate system, but this creates a disadvantage in that the separate system has to be maintained and updated. The use of separate runtimes can interfere with a platform and can create problems that have to be solved with additional complexity.

SUMMARY

This disclosure generally describes computer-implemented methods, software, and systems for using techniques to achieve the distribution of integration scenarios in the cloud. One computer-implemented method includes: deploying, by a cloud integration system, an integration flow (iFlow) as a resource; assigning, by a container orchestration service, the resource to one or more pods; copying, by a pod sync agent, an iFlow definition mapped to the resource into a corresponding pod; assigning, by the pod sync agent, a unique label to the pod based on iFlows deployed into the pod; and creating, by the cloud integration system, a service as an endpoint to the resource, with a rule redirecting calls to the one or more pods containing the resource.

The foregoing and other implementations can each optionally include one or more of the following features, alone or in combination. In particular, one implementation can include all the following features:

In a first aspect, combinable with any of the previous aspects, the method further comprising: receiving, by the cloud integration system, a request to call to the service of a specific resource; determining, using rules, a specific pod to which to direct the request; determining, by the cloud integration system, current loads of pods containing the specific resource; and forwarding, using a unique label, the request to a pod with a low load.

In a second aspect, combinable with any of the previous aspects, wherein the low load is based on one or more of central processor unit (CPU) usage or memory usage.

In a third aspect, combinable with any of the previous aspects, wherein determining current loads of pods containing the specific resource is performed by a load balancer.

In a fourth aspect, combinable with any of the previous aspects, further comprising maintaining, using the pod sync agent, information regarding resources running on each pod.

In a fifth aspect, combinable with any of the previous aspects, further comprising performing load balancing of resources running on the pods.

In a sixth aspect, combinable with any of the previous aspects, wherein the load balancing uses the container orchestration service accessing uniform resource locators (URLs) that expose endpoints to the services.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

This disclosure generally describes computer-implemented methods, software, and systems for handling load distributions of applications running in the cloud. For example, techniques can be used to provide ways for routing requests to applications. The techniques can use services that externally expose endpoints and pods that provide the runtime instances. One or more resources can be deployed to each pod. The techniques described in the present disclosure can include mechanisms that are extensible, such as to add new resource types. Labels can be used as markers for pod instances, where each label defines a routing associated with the service.

The techniques described in the present disclosure can leverage native technologies to solve routing challenges in integration scenarios. For example, the same integration scenario can be deployed to multiple pods, providing scaling out (or load handling) of the integration scenario. An integration scenario can be treated as a resource from the point of view of a container orchestration service and can be deployed to one or more pod instances. A label can be assigned to each pod instance after the integration scenario is deployed as a resource. The label information can be used to identify which pod instance can be used for routing a request.

Advantages that result from techniques described in the present disclosure can include the following. The use of platform-provided technologies means that no additional runtime has to be deployed, such as by using an NGINX instance. This can reduce maintenance and development efforts, because the platform can simply take care of doing the routing. Since each integration flow can serve as an extended platform resource, platform native constructs and application programming interfaces (APIs) can be used to individually manage integration flows. Integration flows can be scaled individually and can be auto-scaled by the platform. Life cycle operations, such as create, delete, and auto-restart, can be managed in a similar manner as platform resources such as pods. Concepts such as rolling updates and zero down time can also be extended to integration flows. Since integration flows are virtual resources managed by the platform and are therefore not directly linked to system resources of the platform, integration flows can be scaled independently to other system resources such as pods and virtual machines. The scaling can help to achieve maximum density on available system resources.

Figure 1:
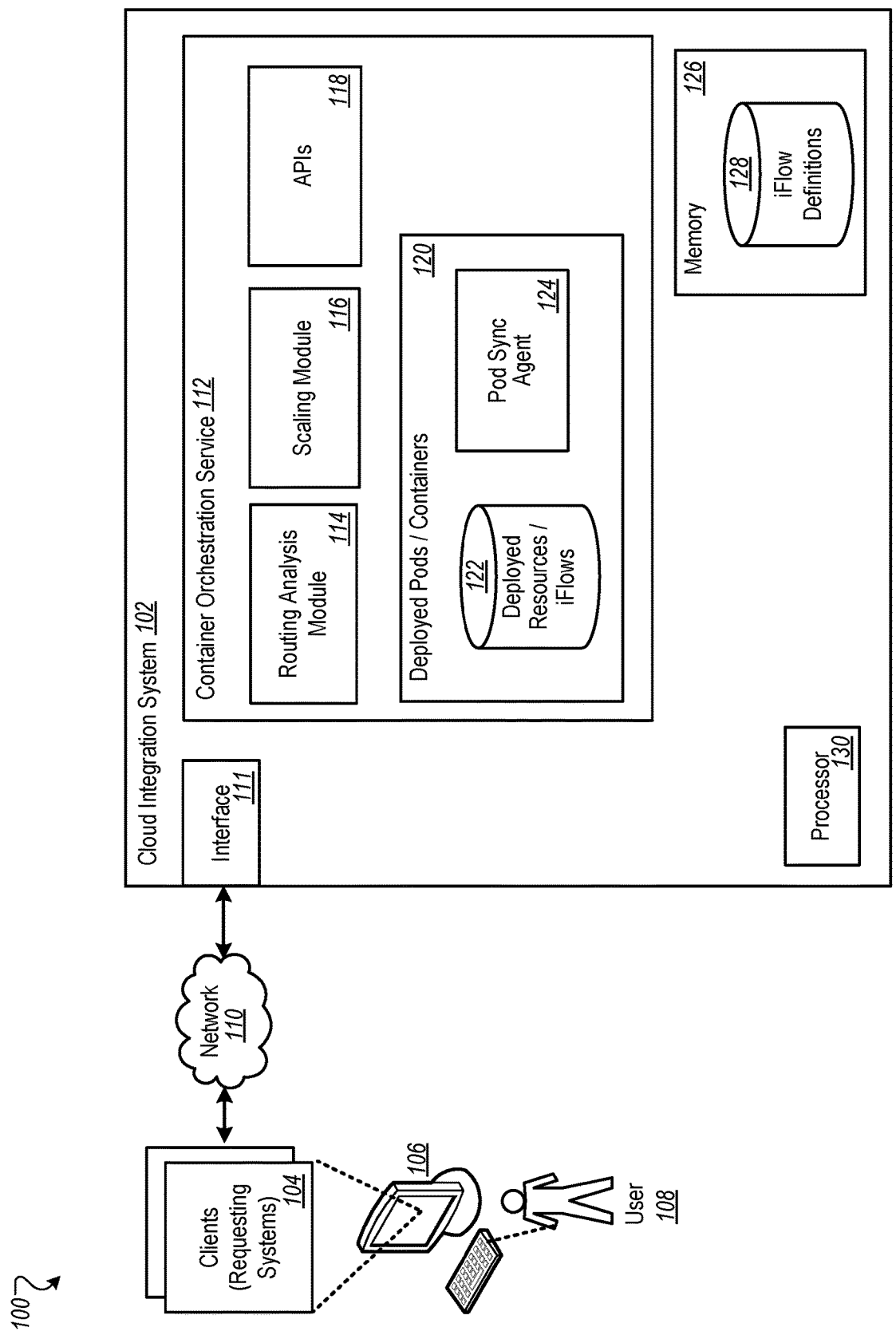
FIG. 1 is a block diagram of an example environment for deploying resources.

FIG. 1 is a block diagram of an example environment 100 for deploying resources. The environment 100 includes a cloud integration system 102 that can receive requests from clients/requesting systems 104, for example, to deploy an integration flow (iFlow) and place the iFlow (as a resource) into a pod instance. The clients/requesting systems 104 can include any system that sends requests to the cloud integration system 102. For example, a client/requesting system 104 can include a client 106 that is used by a user 108. A network 110 can connect the clients/requesting systems 104 to the cloud integration system 102. In some implementations, the network 110 can include some or all of the cloud integration system 102. An interface 111 can receive requests that are received through the network 110 from the clients/requesting systems 104.

The cloud integration system 102 includes a container orchestration service 112 that is configured to handle the lifecycle of container instances. The cloud integration system 102 can also perform services such as routing, scaling, and API exposure. The cloud integration system 102 can handle the request that is received to deploy an iFlow and place the iFlow (as a resource) into the pod instance.

A routing analysis module 114 can use information associated with pods to determine which pods to be sent requests. In order to support load balancing that is performed by the platform, route analysis can be used to analyze the traffic on each integration flow and pod. The analysis can result in generating metrics and doing further resource optimization such as trigger increasing or decreasing or shifting of integration flows from one pod to another using the content orchestration service. A scaling module 116 can determine when to add more pods.

APIs 118 can be provided as extensions or services of the container orchestration service 112. The APIs can enable pod identification of labeled resources, including supporting queries to different pods and queries to pod sync agents. An example query can be a query to identify pods at which a resource is running. The APIs can provide pod transmission, including providing connections to pods for sending requests after identifying where the requests are to be sent. Endpoint APIs can be used to manage locations at which external systems can communicate requests.

A deployed pods/containers component 120 can be configured to analyze resources in pods and generate labels for the resources. The deployed pods/containers component 120 includes a data store of deployed resources/iFlows 122 and at least one pod sync agent 124. The pod sync agent 124 can return responses to the container orchestration service 112 when a pod identification is sent. The pod sync agent 124 can also manage information associated with connections back to endpoint APIs.

Memory 126 includes a data store of iFlow definitions 128 for deployed pods. At least one processor 130 can perform the processing functions of the cloud integration system 102. For example, the at least one processor 130 can execute instructions of the interface 111 and the container orchestration service 112 (including its components).

Figure 2:
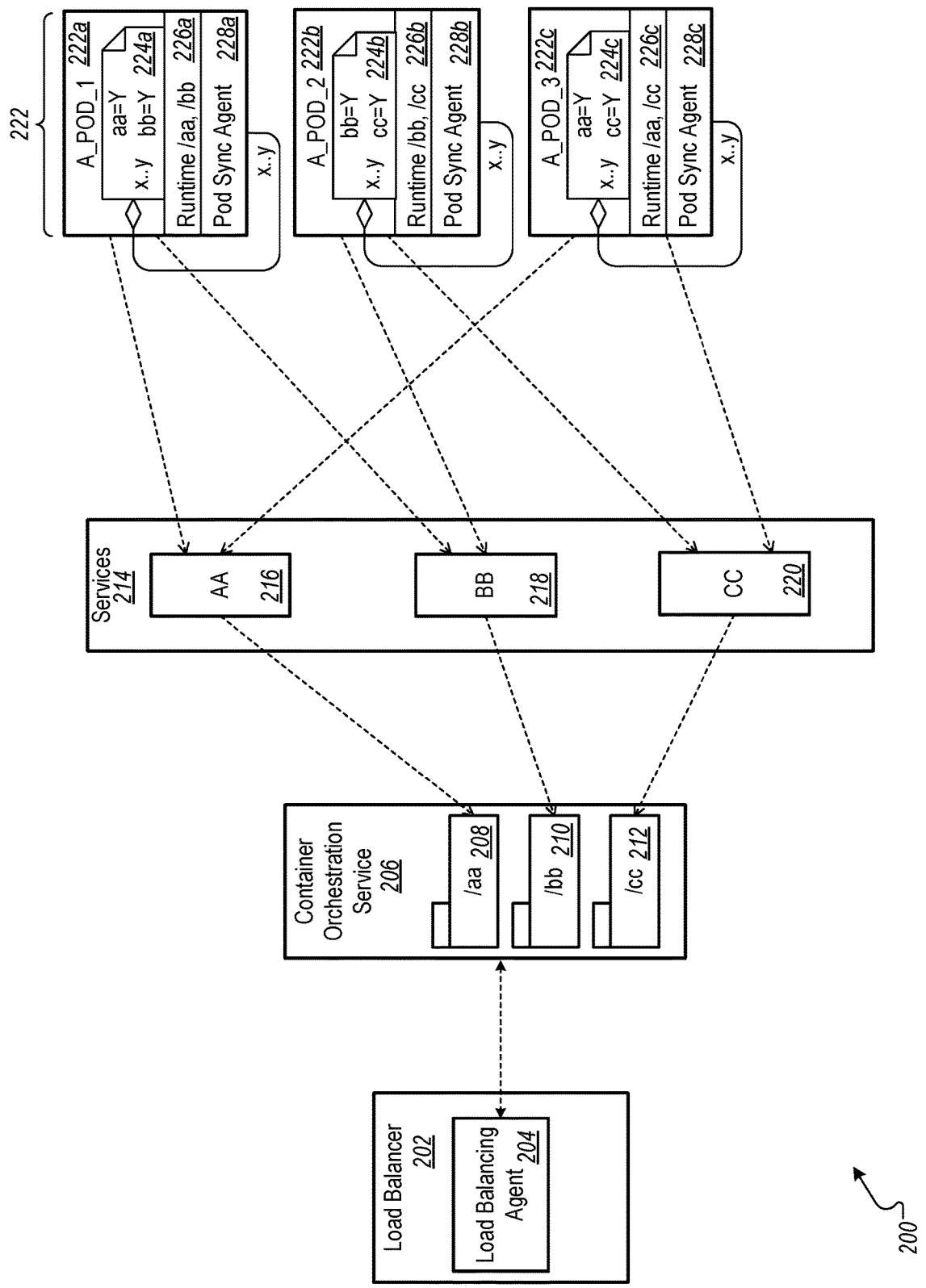
FIG. 2 is a block diagram of an example environment for handling load distributions of applications running in the cloud.

FIG. 2 is a block diagram of an example environment 200 for handling load distributions of applications running in the cloud. For example, the environment 200 can include operations that correspond to the environment 100.

A load balancer 202 can perform load balancing, for example, of integration scenarios running in the cloud. The load balancer 202 can use a load balancing agent 204 (for example, catchall.sap.io/*) to interface with a container orchestration service 206. The container orchestration service 206 can be implemented, for example, as the container orchestration service 112. The container orchestration service 206 can in be implemented, at least in part, using services of a relational database management system (RDBMS) that can expose endpoints using uniform resource locators (URLs) to services 214. For example, the container orchestration service 206 can expose endpoints 208, 210, and 212 corresponding to services 216, 218, and 220, respectively.

The services 214 can provide access to pods 222. The pods 222a-222c can serve as ports or worker sets. Documents 224a-224c can represent iFlows, and each of the ports can have different labels (for example, aa, bb, and cc) associated with resources to which access is provided by the services 214 (for example, the service 216 "AA" corresponding to the label "aa" and so on). Label lists 226a-226c can identify the labels, and hence resources, in each of the pods 222. For example, labels "aa" and "bb" are included in the label list 226a, which are the labels for resources running on the pod 222a. Pod sync agents 228a-228c in the pods 222a-222c, respectively, can handle synchronization of the pods 222, including keeping track of labels corresponding to resources running on the pods. The pods 222 can be implemented, for example, as the deployed pods/containers component 120.

Figure 3:
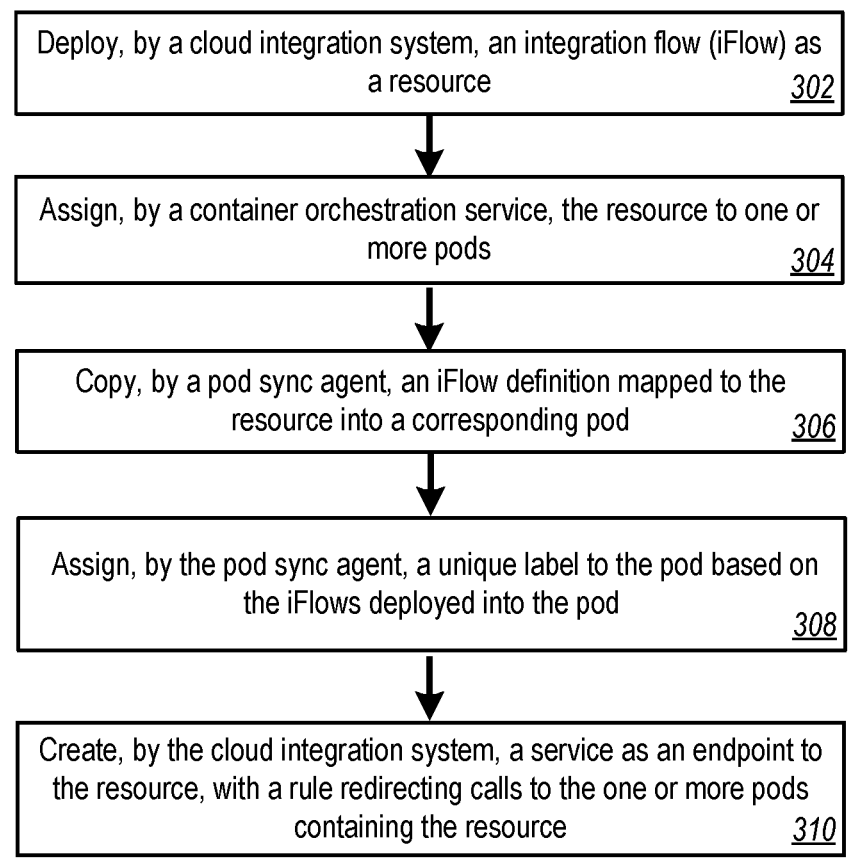
FIG. 3 is a flowchart of an example method for deploying resources.

FIG. 3 is a flowchart of an example method 300 for deploying resources. Method 300 can be performed by the cloud integration system 102. For clarity of presentation, the description that follows generally describes method 300 in the context of FIGS. 1 and 2.

At 302, an iFlow is deployed as a resource by a cloud integration system. For example, an iFlow for a resource (that will subsequently be labeled as "aa") can be deployed by the container orchestration service 112.

At 304, the resource is assigned by a container orchestration service to one or more pods. As an example, the container orchestration service 112 can deploy the resource (that will subsequently have the label of "aa") to the pod 222a.

At 306, an iFlow definition mapped to the resource is copied into a corresponding pod by a pod sync agent. As an example, the pod sync agent 124 can copy an iFlow definition 128 to the pod 222a.

At 308, a unique label is assigned by the pod sync agent to each resource based on the iFlows deployed into the pod. For example, the pod sync agent 124 can assign the label "aa" to the resource.

At 310, a service is created as an endpoint to the resource by the cloud integration system, with a rule redirecting calls to the one or more pods containing the resource. As an example, the container orchestration service 112 can create the service 216 that corresponds to the resource having the label "aa."

In some implementations, the method 300 can further include steps for load balancing. For example, load balancing can be used to balance the load of resources running on the pods 222. Steps for load balancing are described with reference to FIG. 4.

Figure 4:
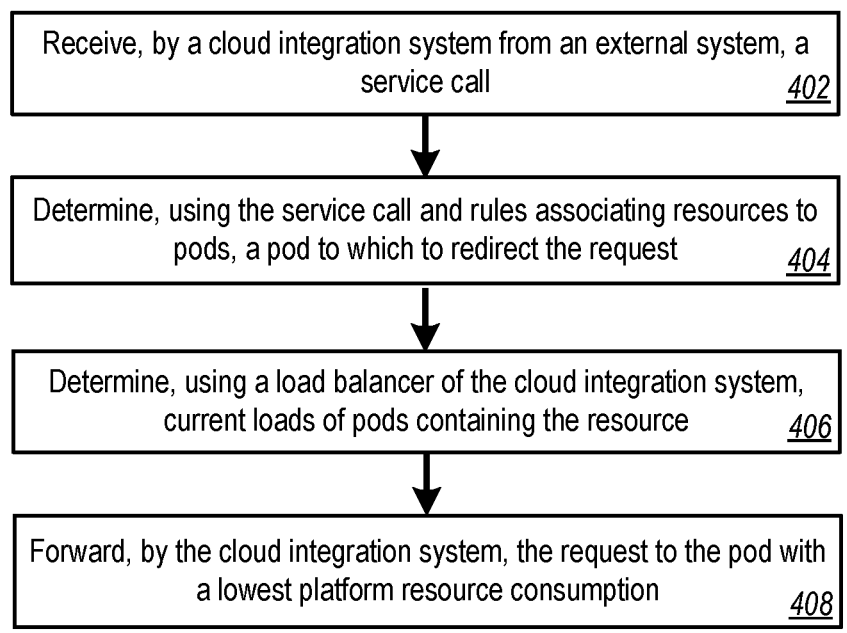
FIG. 4 is a flowchart of an example method for handling a service request.

FIG. 4 is a flowchart of an example method 400 for handling a service request. Method 400 can be performed by the cloud integration system 102. For clarity of presentation, the description that follows generally describes method 400 in the context of FIGS. 1 and 2.

At 402, a request to call the service of a specific resource is received by the cloud integration system. For example, the cloud integration system 102 can receive a request from the client/requesting system 104 to service an iFlow that is currently executing.

At 404, rules are used by the cloud integration system to determine a specific pod to which to direct the request. For example, the cloud integration system 102 can determine the pods 222 that are currently executing the resource labeled "aa."

At 406, current loads of pods containing the specific resource are determined by the cloud integration system. As an example, the load balancer 222 can determine the loads on the pods 222 that are executing the resource labeled "aa." The loads can be based on one or more of CPU usage or memory usage.

At 408, the cloud integration system can forward, using a unique label, the request to a pod with a low load. As an example, the load balancer 222 can forward the request to the pod 222b if the pod 222b is experiencing a lighter load than the other pods 222.

Figure 5:
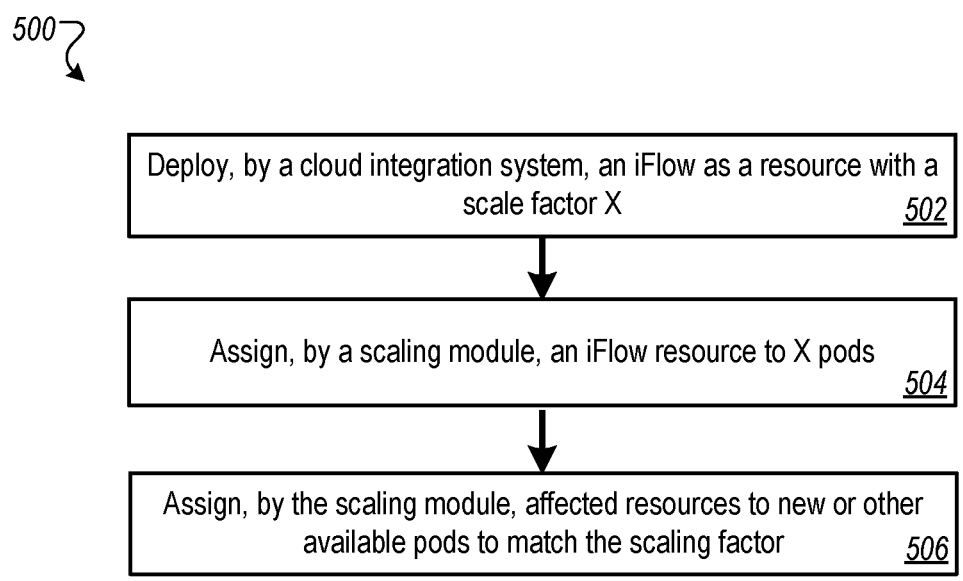
FIG. 5 is a flowchart of an example method for assigning, using a scaling module, resources to new or other available pods.

FIG. 5 is a flowchart of an example method 500 for assigning, using a scaling module, resources to new or other available pods. Method 500 can be performed by the cloud integration system 102. For clarity of presentation, the description that follows generally describes method 500 in the context of FIGS. 1 and 2.

At 502, an iFlow is deployed by a cloud integration system as a resource with a scale factor X. For example, the cloud integration system 102 can deploy an iFlow as one of the deployed resources/iFlows 122.

At 504, the iFlow resource is assigned by a scaling module to X pods. For example, the scaling module 116 can assign the iFlow to X pods.

At 506, affected resources are assigned by the scaling module to new or other available pods to match the scaling factor. For example, in case of a detection of any pod crash that affects iFlow resources, the scaling module 116 can assign the resources to other pods.

Figure 6:
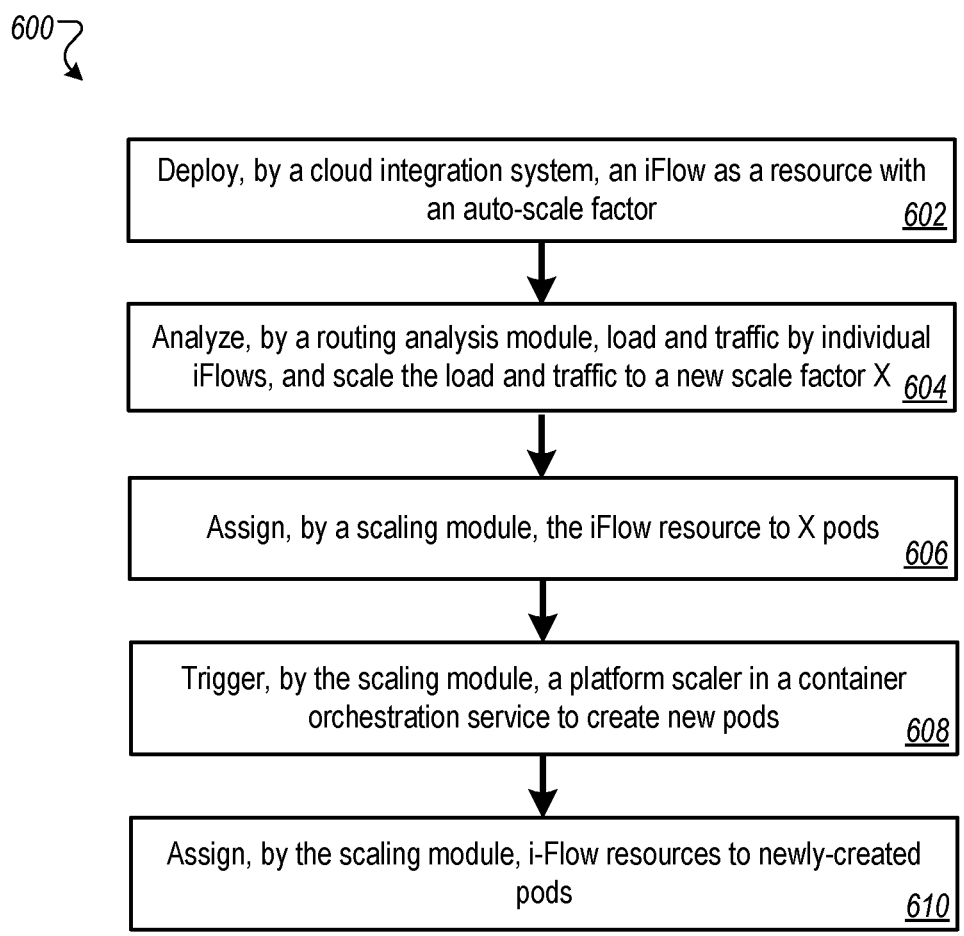
FIG. 6 is a flowchart of an example method for assigning resources to new pods.

FIG. 6 is a flowchart of an example method 600 for assigning resources to new pods. Method 600 can be performed by the cloud integration system 102. For clarity of presentation, the description that follows generally describes method 600 in the context of FIGS. 1 and 2.

At 602, an iFlow is deployed by a cloud integration system as a resource with an auto-scale factor. For example, the auto-scale factor can represent an initial number of pods for initial deployment of iFlows by the cloud integration system 102.

At 604, load and traffic by individual iFlows are analyzed by a routing analysis module, and the load and traffic are scaled to X. For example, the scaling module 116 can determine X after analyzing the traffic on the individual iFlows.

At 606, the iFlow resource is assigned to X pods by the scaling module. As an example, the scaling module 116 can assign the iFlow resource to X existing pods, updating the deployed pods/containers 120.

At 608, a platform scaler in a container orchestration service is triggered by the scaling module to create new pods. For example, the container orchestration service 112 scaling module 116 can be triggered to create new pods in the deployed pods/containers 120.

At 610, iFlow resources are assigned by the scaling module to newly-created pods. For example, once the new pods are created, the scaling module 116 can assign the iFlow resources to new pods and update the deployed pods/containers 120.

The techniques described in the present disclosure can be used for managing and delivering integration flows into a runtime integration engine. The integration flows can be substituted for dynamic runtime content provided to a corresponding dynamic runtime engine, for example, using examples listed in Table 1:

TABLE 1

Dynamic Runtime Content and Runtime Engines

| Dynamic Runtime Content | Runtime Engine |
|---|---|
| Web Content (e.g., Web Application Archive (WAR)) | Web Server (e.g., TOMCAT) |
| Open Services Gateway Initiative (OSGI) Bundle (e.g., JAVA Archive (JAR)) | OSGI Runtime (e.g., KARAF) |
| Functions | Serverless Function Engines |
| Firewall rules | Firewall Engines |
| Scripts | Scripting Engines |

Figure 7:
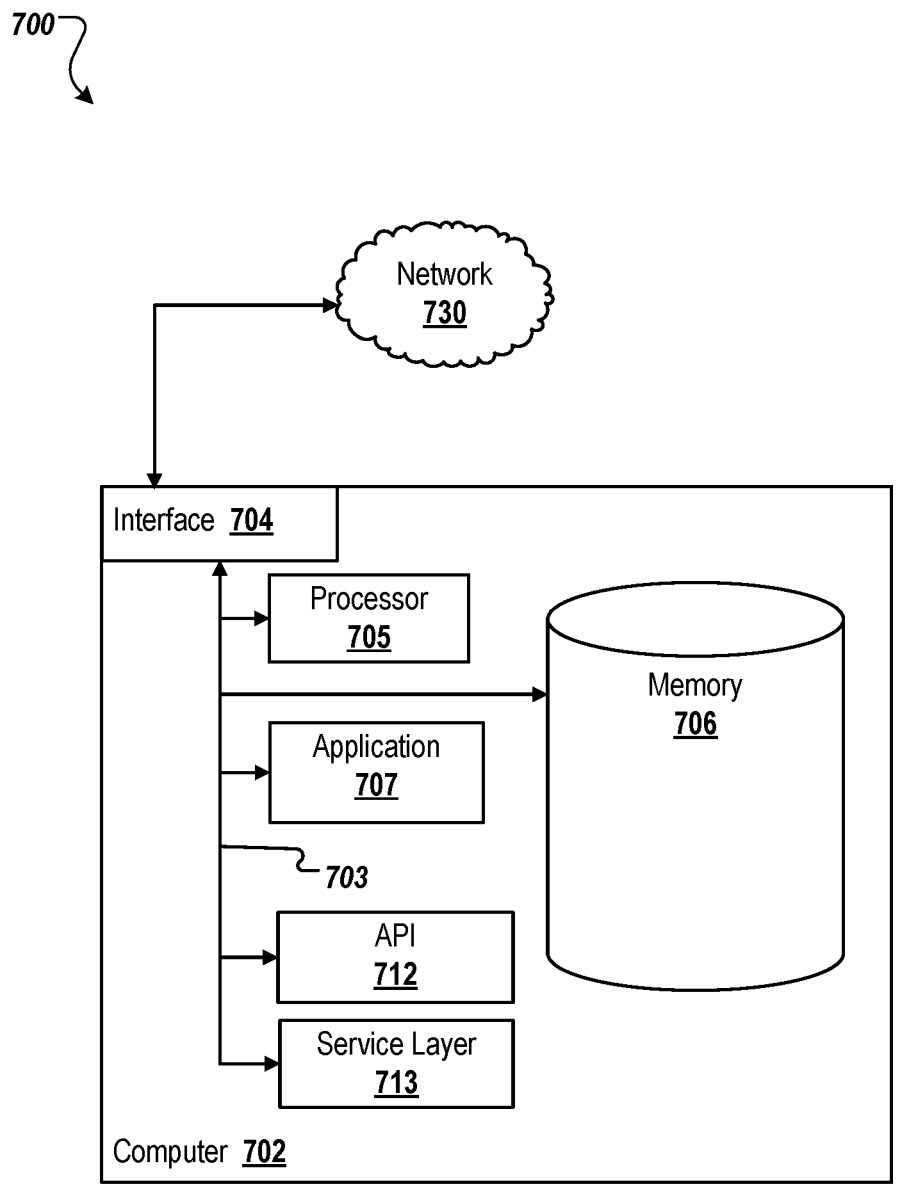
FIG. 7 is a block diagram of an exemplary computer system used to provide computational functionalities associated with described algorithms, methods, functions, processes, flows, and procedures as described in the instant disclosure.

FIG. 7 is a block diagram of an exemplary computer system 700 used to provide computational functionalities associated with described algorithms, methods, functions, processes, flows, and procedures as described in the instant disclosure.

The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 702 may comprise a computer that includes an input device, such as a keypad, keyboard, touch screen, or other device that can accept user information, and an output device that conveys information associated with the operation of the computer 702, including digital data, visual, or audio information (or a combination of information), or a graphical user interface (GUI).

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, business intelligence (BI) server, or other server (or a combination of servers).

The computer 702 can receive requests over network 730 from a client application (for example, executing on another computer 702) and responding to the received requests by processing the said requests in an appropriate software application. In addition, requests may also be sent to the computer 702 from internal users (for example, from a command console or by other appropriate access method), external or third-parties, other automated applications, as well as any other appropriate entities, individuals, systems, or computers.

Each of the components of the computer 702 can communicate using a system bus 703. In some implementations, any or all of the components of the computer 702, both hardware or software (or a combination of hardware and software), may interface with each other or the interface 704 (or a combination of both) over the system bus 703 using an API 712 or a service layer 713 (or a combination of the API 712 and service layer 713). The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined business functionalities through a defined interface. For example, the interface may be software written in JAVA, C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of the instant disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems in a distributed environment that are connected to the network 730 (whether illustrated or not). Generally, the interface 704 comprises logic encoded in software or hardware (or a combination of software and hardware) and operable to communicate with the network 730. More specifically, the interface 704 may comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a memory 706 that holds data for the computer 702 or other components (or a combination of both) that can be connected to the network 730 (whether illustrated or not). For example, memory 706 can be a database storing data consistent with this disclosure. Although illustrated as a single memory 706 in FIG. 7, two or more memories may be used according to particular needs, desires, or particular implementations of the computer 702 and the described functionality. While memory 706 is illustrated as an integral component of the computer 702, in alternative implementations, memory 706 can be external to the computer 702.

The application 707 is an algorithmic software engine providing functionality according to particular needs, desires, or particular implementations of the computer 702, particularly with respect to functionality described in this disclosure. For example, application 707 can serve as one or more components, modules, applications, etc. Further, although illustrated as a single application 707, the application 707 may be implemented as multiple applications 707 on the computer 702. In addition, although illustrated as integral to the computer 702, in alternative implementations, the application 707 can be external to the computer 702.

There may be any number of computers 702 associated with, or external to, a computer system containing computer 702, each computer 702 communicating over network 730. Further, the term "client," "user," and other appropriate terminology may be used interchangeably as appropriate without departing from the scope of this disclosure. Moreover, this disclosure contemplates that many users may use one computer 702, or that one user may use multiple computers 702.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a GUI. The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
    deploying, by a cloud integration system, an integration flow (iFlow) as a resource;
    assigning, by a container orchestration service, the resource to one or more pods;
    copying, by a pod sync agent, an iFlow definition mapped to the resource into a corresponding pod;
    assigning, by the pod sync agent, a unique label to the pod based on iFlows deployed into the pod; and
    creating, by the cloud integration system, a service as an endpoint to the resource, with a rule redirecting calls to the one or more pods containing the resource.

2. The computer-implemented method of claim 1, further comprising:
    receiving, by the cloud integration system, a request to call to the service of a specific resource;
    determining, using rules, a specific pod to which to direct the request;
    determining, by the cloud integration system, current loads of pods containing the specific resource; and
    forwarding, using a unique label, the request to a pod with a low load.

3. The computer-implemented method of claim 2, wherein the low load is based on one or more of central processor unit (CPU) usage or memory usage.

4. The computer-implemented method of claim 2, wherein determining current loads of pods containing the specific resource is performed by a load balancer.

5. The computer-implemented method of claim 1, further comprising maintaining, using the pod sync agent, information regarding resources running on each pod.

6. The computer-implemented method of claim 2, further comprising performing load balancing of resources running on the pods.

7. The computer-implemented method of claim 6, wherein the load balancing uses the container orchestration service accessing uniform resource locators (URLs) that expose endpoints to the services.

8. A system comprising:
    memory storing tables storing deployed resources/iFlows and iFlow definitions; and
    a server performing operations comprising:
        deploying, by a cloud integration system, an iFlow as a resource;
        assigning, by a container orchestration service, the resource to one or more pods;
        copying, by a pod sync agent, an iFlow definition mapped to the resource into a corresponding pod;
        assigning, by the pod sync agent, a unique label to the pod based on iFlows deployed into the pod; and
        creating, by the cloud integration system, a service as an endpoint to the resource, with a rule redirecting calls to the one or more pods containing the resource.

9. The system of claim 8, the operations further comprising:
    receiving, by the cloud integration system, a request to call to the service of a specific resource;
    determining, using rules, a specific pod to which to direct the request;
    determining, by the cloud integration system, current loads of pods containing the specific resource; and
    forwarding, using a unique label, the request to a pod with a low load.

10. The system of claim 9, wherein the low load is based on one or more of CPU usage or memory usage.

11. The system of claim 9, wherein determining current loads of pods containing the specific resource is performed by a load balancer.

12. The system of claim 8, the operations further comprising maintaining, using the pod sync agent, information regarding resources running on each pod.

13. The system of claim 9, the operations further comprising performing load balancing of resources running on the pods.

14. The system of claim 13, wherein the load balancing uses the container orchestration service accessing URLs that expose endpoints to the services.

15. A non-transitory computer-readable media encoded with a computer program, the program comprising instructions that when executed by one or more computers cause the one or more computers to perform operations comprising:
- deploying, by a cloud integration system, an iFlow as a resource;
- assigning, by a container orchestration service, the resource to one or more pods;
- copying, by a pod sync agent, an iFlow definition mapped to the resource into a corresponding pod;
- assigning, by the pod sync agent, a unique label to the pod based on iFlows deployed into the pod; and
- creating, by the cloud integration system, a service as an endpoint to the resource, with a rule redirecting calls to the one or more pods containing the resource.

16. The non-transitory computer-readable media of claim 15, the operations further comprising:
- receiving, by the cloud integration system, a request to call to the service of a specific resource;
- determining, using rules, a specific pod to which to direct the request;
- determining, by the cloud integration system, current loads of pods containing the specific resource; and
- forwarding, using a unique label, the request to a pod with a low load.

17. The non-transitory computer-readable media of claim 16, wherein the low load is based on one or more of CPU usage or memory usage.

18. The non-transitory computer-readable media of claim 16, wherein determining current loads of pods containing the specific resource is performed by a load balancer.

19. The non-transitory computer-readable media of claim 15, the operations further comprising maintaining, using the pod sync agent, information regarding resources running on each pod.

20. The non-transitory computer-readable media of claim 16, the operations further comprising performing load balancing of resources running on the pods.

* * * * *